E. R. SPRINGER.
GEAR SHIFT.
APPLICATION FILED AUG. 2, 1916.

1,216,178.

Patented Feb. 13, 1917.
3 SHEETS—SHEET 1.

Witnesses
J. H. Crawford
J W Barnes

Inventor
E. R. Springer,
By Victor J. Evans
Attorney

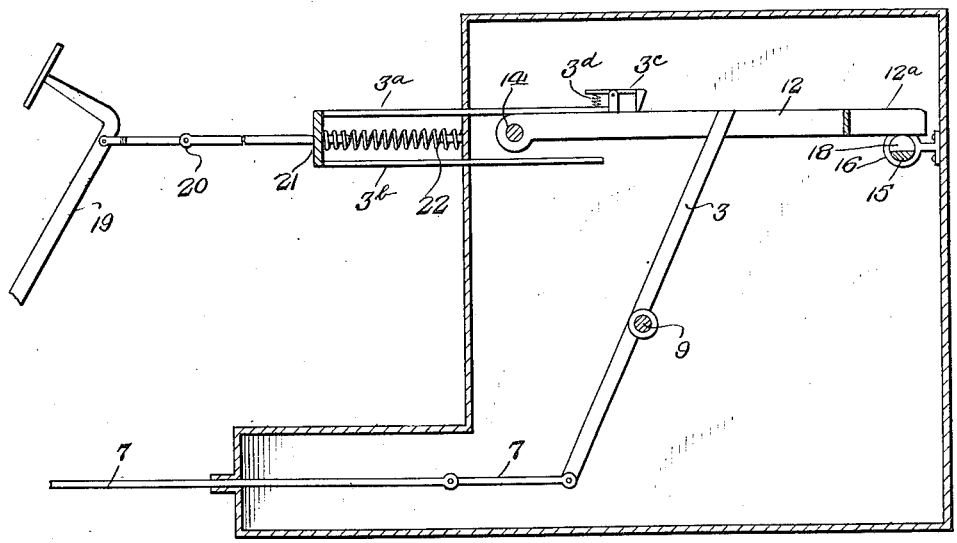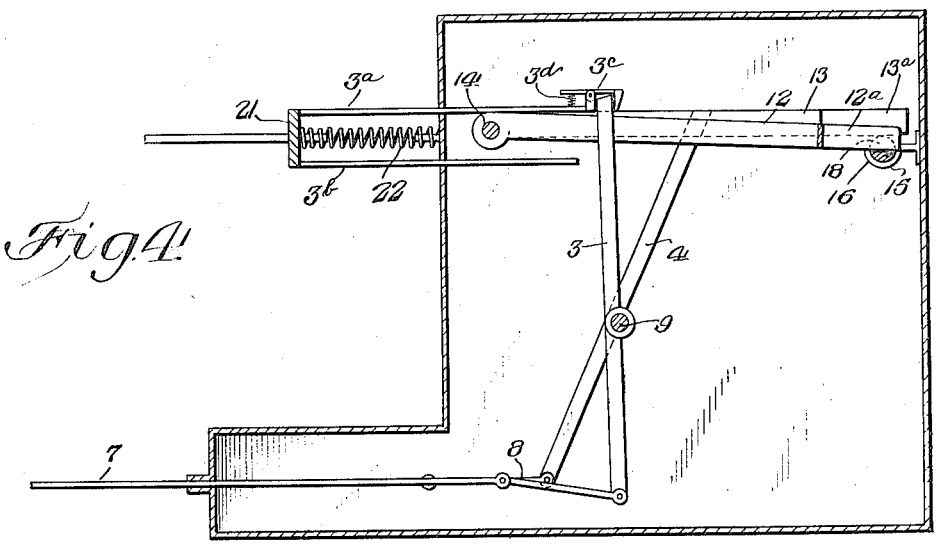

E. R. SPRINGER.
GEAR SHIFT.
APPLICATION FILED AUG. 2, 1916.
1,216,178.
Patented Feb. 13, 1917.
3 SHEETS—SHEET 3.
*Fig. 3.*
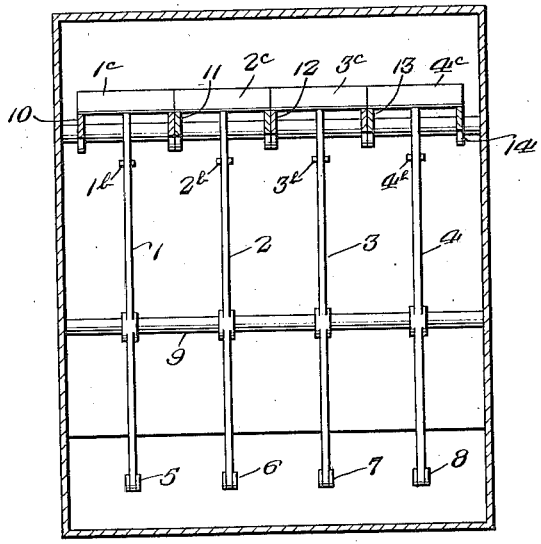
*Fig. 7.*
*Fig. 6.*
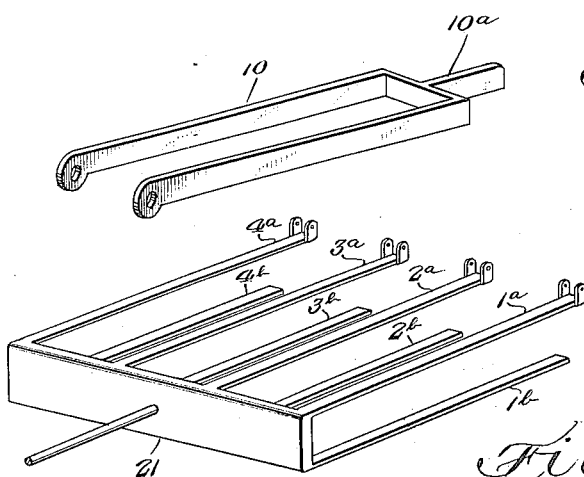
Witnesses
J H Crawford
J W Garner
Inventor
E. R. Springer,
By Victor J. Evans
Attorney

UNITED STATES PATENT OFFICE.

EDWARD R. SPRINGER, OF PRINCETON, ILLINOIS.

GEAR-SHIFT.

1,216,178.  Specification of Letters Patent.  Patented Feb. 13, 1917.

Application filed August 2, 1916. Serial No. 112,796.

*To all whom it may concern:*

Be it known that I, EDWARD R. SPRINGER, a citizen of the United States, residing at Princeton, in the county of Bureau and State of Illinois, have invented new and useful Improvements in Gear-Shifts, of which the following is a specification.

This invention is an improved automobile gear shift - mechanism by means of which any preselected shifting lever may be operated but not until the clutch pedal is pressed down and released; all danger of gear stripping is obviated and the necessity of the employment of a large gear shifting lever is also obviated.

The object of the invention is to provide an improved gear shifting mechanism of this character which is simple in construction, is reliable in operation, and which can be controlled by the usual clutch lever and a selecting lever.

The invention consists in the features of construction, combination, and arrangement of devices, hereinafter fully described and claimed.

In the accompanying drawings:—

Fig. 2 is a longitudinal sectional view of the same.

Fig. 3 is a transverse sectional view of the same.

Figs. 4 and 5 are detail views.

Fig. 6 is a detail perspective view of the shift lever operating element.

Fig. 7 is a similar view of one of the controlling elements.

Figure 1:
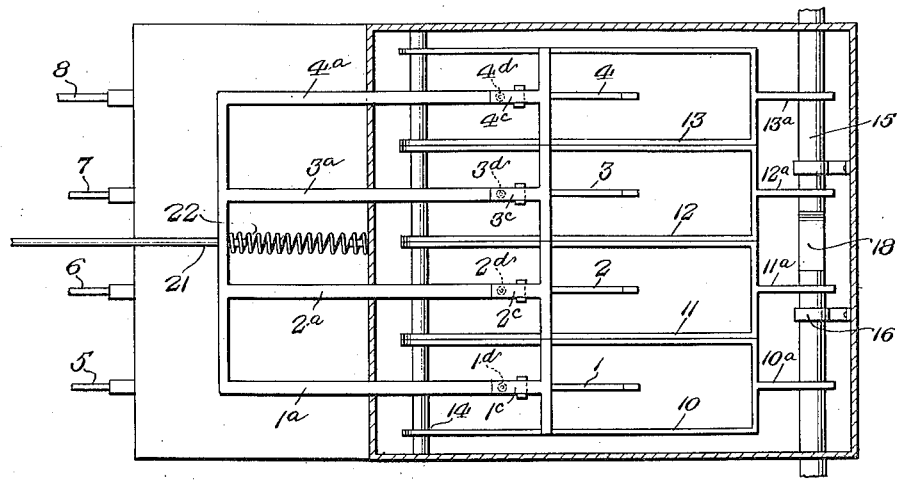
Figure 1 is a plan of a gear shifting mechanism constructed and arranged in accordance with my invention.
Figure 8:
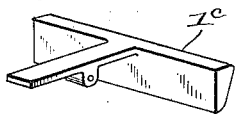
Fig. 8 is a similar view of one of the dogs.
Figure 5:
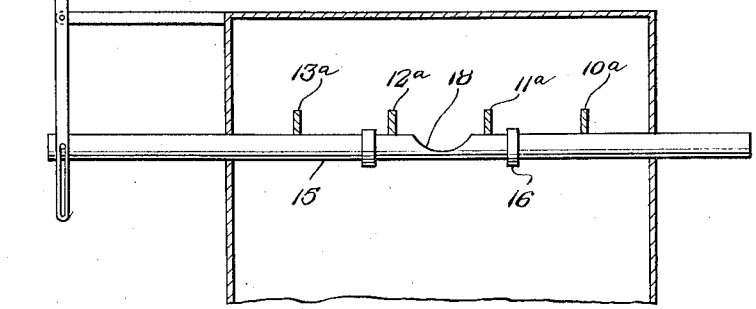

The usual shift levers 1, 2, 3, 4, are here shown, connected respectively to the shift gears by rods 5, 6, 7, 8, the shift levers being pivotally mounted on a shaft 9. Any suitable number of the shift levers and shift gears and connections may be employed.

Forked controlling elements 10, 11, 12, 13, are provided for the respective shift levers, the upper ends of the shift levers being arranged between the fork arms of the respective controlling elements, and said controlling elements being pivotally mounted at one end as at 14. Each controlling element is provided at its front end with an arm, the said arms being respectively indicated at $10^a$, $11^a$, $12^a$, and $13^a$. The arms of the controlling elements rest on the upper side of a selecting rod 15 which is mounted for longitudinal movement in supporting guides 16 and which may be moved in either direction by a suitable selecting lever 17. The said selecting rod has a notch 18 in its upper side of suitable depth and the sides of which are inclined. Normally the selecting rod is in such a position that its notch is out of register with the arms of all of the controlling elements so that the controlling elements are all held at the same elevation by the selecting rod. The selecting rod may however be moved by the selecting lever to arrange its notch under the tappet arm of any one of the controlling elements and hence permit the said selected controlling element to drop slightly at its free end as indicated in Fig. 4.

The usual clutch lever is indicated at 19 and is connected as at 20 to a common shift lever operating element 21 which is here shown as a cross head bar provided with a pair of upper and lower arms for each shift lever. The arms for the shift lever 1 are shown at $1^a$, $1^b$, those for the lever 2 are indicated at $2^a$, $2^b$, those for the lever 3 are indicated at $3^a$, $3^b$, and those for the lever 4 are indicated at $4^a$, $4^b$. One pair of arms of the shift lever operating element is provided for each shift lever according to the number of shift levers employed. The upper arms are longer than the lower arms. A shift lever engaging dog is carried by each upper arm of the shift lever operating element, the said dogs being pivotally mounted as shown and being respectively indicated at $1^c$, $2^c$, $3^c$, and $4^c$. The said dogs are T-shaped in plan and the head of each dog bears and is slidable on one of the controlling elements. Each dog is actuated by a spring, the springs being respectively indicated at $1^d$, $2^d$, $3^d$, and $4^d$. When the controlling elements are in normal raised position, held by the selecting rod, the dogs are held by the selecting elements in raised position above and clear of the upper ends of the shift levers. When one of the controlling elements is lowered by a movement of the selecting rod 15, as hereinbefore described, the dog associated with said selecting element is depressed by its spring and caused to engage the associated shift lever. A spring 22 is provided to actuate the shift lever operating element 21, when the clutch or pedal lever 19 is released.

When all of the controlling elements are held in raised position by the selecting rod 15, the clutch lever or pedal can be operated without affecting the gear shifting mechanism. When, however, the selecting rod has been arranged with its notch 18 under the tappet arm of one of the controlling elements and said controlling element has been lowered thereby, and caused to expose the upper end of the shaft lever associated therewith and the clutch lever is then depressed, the shift lever operating lever 21 is caused to move with the clutch lever against the tension of the spring 22, and in the required direction to engage the dog associated with the depressed controlling element, with the shift lever also associated with the depressed controlling element as will be understood. When the clutch lever is released, the spring 22 moves the shift lever operating element 21 in the reverse direction, thereby causing the said dog to operate the preselecting shift lever as will be understood. The lower arms of the shift lever operating element engage the shift levers on the reverse stroke of the shift lever operating element and hold said levers in normal position.

It will be understood that my improved gear shifting mechanism permits the preselection of gears, as it may be set at any time for any gear desired, and the change will not be accomplished until the clutch pedal lever is pressed down and released. Hence all danger of gear stripping is eliminated. The employment of a large gear shifting lever is also obviated.

From the foregoing description, taken in connection with the accompanying drawings, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the appended claims.

Having described my invention, what is claimed is:

1. In combination with a plurality of shift levers, a controlling element for each shift lever, a selecting element to control the movement of any one of the controlling elements to operating position, common operating means for the shift levers including devices to engage the several shift levers, said devices being severally controlled by said controlling elements, and means to actuate the shift lever operating element.

2. In combination with a plurality of shift levers, a controlling element for each shift lever, a selecting element to control the movement of any one of the controlling elements to operating position, common operating means for the shift levers including devices to engage the several shift levers, said devices being severally controlled by said controlling elements, a clutch lever to impart shift lever engaging movement to the shift lever operating element, and a spring to impart shift lever operating movement to said shift lever operating element when the clutch lever is released.

3. In combination with a plurality of shift levers, a controlling element for each shift lever, a selecting element to control the movement of any one of the controlling elements to operating position, common operating means for the shift levers including devices to engage the several shift levers, said devices being severally controlled by said controlling elements, a clutch lever to impart shift lever engaging movement to the shift lever operating element, and a spring to impart shift lever operating movement to said shift lever operating element when the clutch lever is released, said shift lever operating element having means to move the shift levers to initial position when said shift lever operating element is moved to shift lever engaging position.

In testimony whereof I affix my signature.

EDWARD SPRINGER.